United States Patent [19]
Deindl et al.

[11] Patent Number: 6,076,162
[45] Date of Patent: Jun. 13, 2000

[54] CERTIFICATION OF CRYPTOGRAPHIC KEYS FOR CHIPCARDS

[75] Inventors: Michael Deindl, Böblingen; Walter Hänel, Holzgerlingen; Albert Schaal, Tübingen, all of Germany

[73] Assignee: International Business Machines Corporation, Armonk, N.Y.

[21] Appl. No.: 09/010,339

[22] Filed: Jan. 21, 1998

[30] Foreign Application Priority Data

Jan. 22, 1997 [DE] Germany .......................... 197 02 049

[51] Int. Cl.⁷ ........................................... H04L 9/00
[52] U.S. Cl. ........................................... 713/159; 713/156
[58] Field of Search .............................. 380/23, 25, 282, 380/285; 713/159, 156, 181

[56] References Cited

U.S. PATENT DOCUMENTS

| | | | |
|---|---|---|---|
| 5,293,029 | 3/1994 | Iijima | 235/380 |
| 5,541,994 | 7/1996 | Tomko et al. | 380/30 |
| 5,659,616 | 8/1997 | Sudia | 380/23 |
| 5,717,759 | 2/1998 | Micali | 713/156 |
| 5,721,781 | 2/1998 | Deo et al. | 380/25 |
| 5,768,389 | 6/1998 | Ishii | 380/30 |
| 5,781,723 | 7/1998 | Yee et al. | 713/200 |
| 5,805,712 | 9/1998 | Davis | 713/156 |

*Primary Examiner*—Tod R. Swann
*Assistant Examiner*—Matthew Smithers
*Attorney, Agent, or Firm*—A. P. Tennent

[57] ABSTRACT

The invention relates to a procedure for the certification of cryptographic keys for use in chipcards. In this procedure, a certification key and a certificate are transferred to the chipcard. The first part of the certificate includes the cryptographic key and the second part of the certificate includes a digital signature of the first part of the certificate. The digital certificate is subsequently checked by means of the certification key on the chipcard.

16 Claims, 1 Drawing Sheet

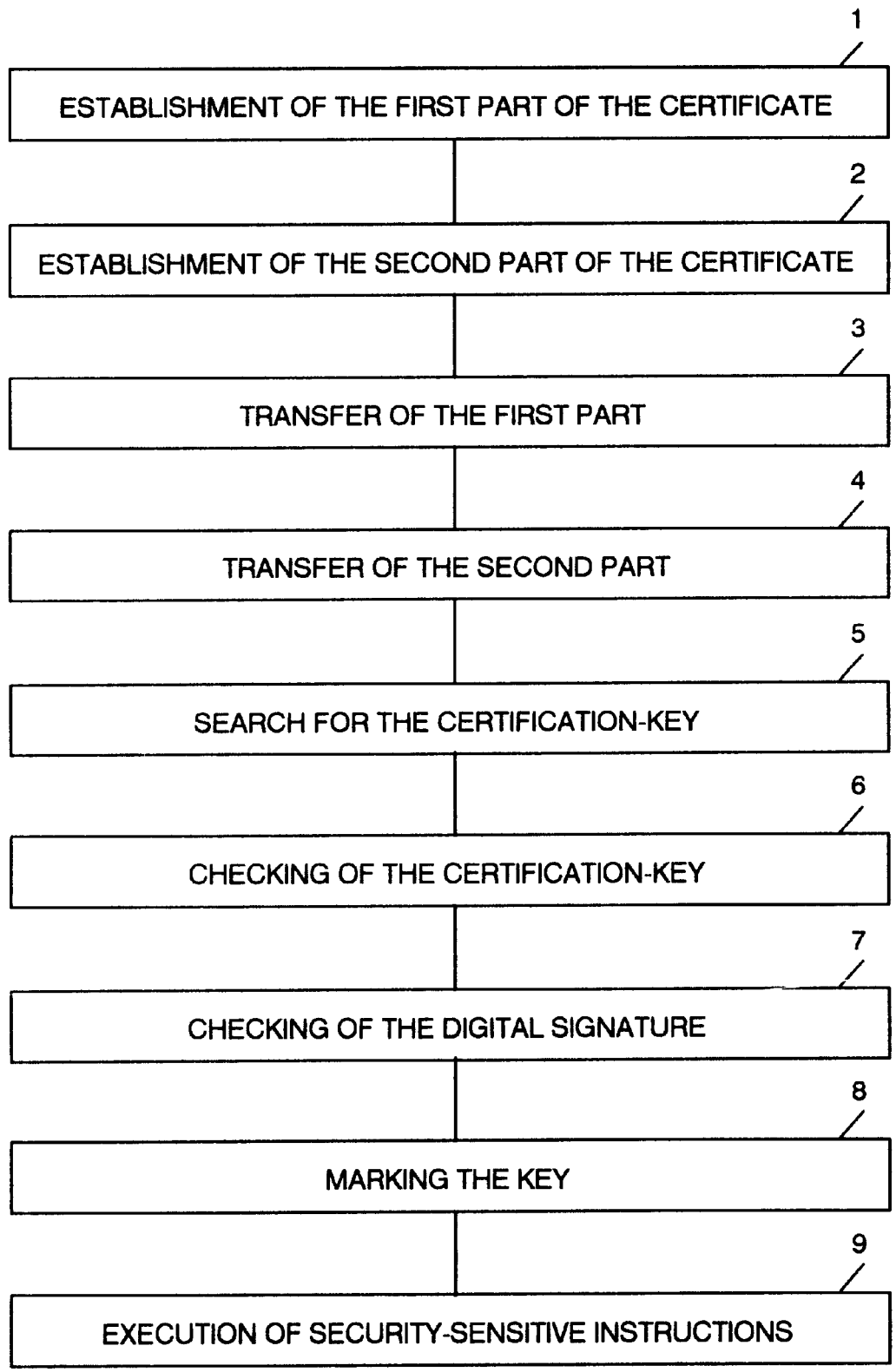

CERTIFICATION OF CRYPTOGRAPHIC KEYS FOR CHIPCARDS

TECHNICAL FIELD

The invention relates to the certification of cryptographic keys for chipcards.

BACKGROUND ART

The protection and confidential retention of data in a chipcard constitutes one of the principle advantages compared with other forms of data carriers such as magnetic stripe cards or diskettes. For this reason, a form of chip hardware tailored to this purpose and various cryptographic procedures are known.

Cryptographic procedures include symmetrical and asymmetrical procedures. In the case of a symmetric cryptographic procedure, there exists just one key which is used both for encoding and decoding (sometimes called encrypting and decrypting) the data which can be exchanged with the chipcard. This key must be kept secret as anyone who knows this key can also read information contained in encoded data. This gives rise to the problem of how this key can be exchanged between the communicating partners. It is not possible to pass on the key directly over public networks because then the key would no longer be a secret.

This problem is partially resolved by the assistance of asymmetric cryptographic procedures. In this situation there is a key V for encoding and a key E for decoding. The particular point here is that only one of the two keys has to be kept secret. The key V is known to the general public while the key E is secret. If the sender wishes to send a secret message to a receiving party, he uses the publicly-known key V to encode the information. When the receiving party receives the encoded information, he can decode it with the aid of secret Key E. The reverse situation is also possible where the Key V is secret and the Key E is known to the general public.

The asymmetric cryptographic procedures solve the problem of exchanging the keys. However, a new problem then arises. The authenticity of the publicly-known key must be checked. This takes place by the publicly-known key being certified by a trustworthy authority. To this end, a certificate is produced which demonstrates the following component parts:

a publicly-known key;

the name of the owner of the publicly-known key;

the applications/application areas for which this publicly-known key may be used; and a digital signature of the trustworthy authority.

From an information-technology point of view, the digital signature amounts to a kind of cryptographic check-sum of the other components of the certificate similar to a MAC (Message Authentication Code) calculated through a prescribed data string. The trustworthy authority creates the digital signature to allow others to confirm that the elements of data (components) in the certificate belong to one another.

There is a standard for the construction and format of a certificate, namely X.509. This Standard arose in association with large data banks and therefore presupposes access to computers with high performance capacities. The evaluation of an X.509 Certificate with the aid of the processor of a chipcard is not possible.

Therefore, in the use of asymmetric cryptographic procedures with chipcards, the chipcard only serves to retain one of the cryptographic keys. Authorization for the use of this key with the asymmetric cryptographic procedure is calculated outside the chipcard by using a computer with a larger computing capacity.

SUMMARY OF THE INVENTION

It is an advantage of the present invention that certification of cryptographic keys for chipcards is more securely and economically accomplished.

A further advantage of the present invention is that a new level of security is created.

A still further advantage of the present invention is that in one embodiment, the invention can be used with non-encoded data.

These advantages are obtained by the present invention over the current state of the art by incorporating a certifying cryptographic key into the chipcard. In this way, the functionality of asymmetric cryptographic procedures is completely integrated in chipcards. A new level of security is generated and the area of possible applications for chipcards is extended. These advantages are achieved by means of a certificate which is simple in its structure, is tailor-made for chipcards and which can be used in a certification procedure which is capable of being carried out on chipcards.

An extension of the invention provides that the checking of the digital signature on the chipcard embraces the following steps: the conversion of the digital signature on the chipcard by means of the certification key; the generation of an electronic fingerprint for the first part of the certificate; and the comparison of the converted digital signature with the electronic fingerprint of the first part of the certificate. In this manner, non-encoded data is advantageously compared, encrypted and decrypted.

Verifying the authenticity of the digital signature on the chipcard according to one embodiment of the inventions includes the following steps: production of an electronic fingerprint in the first part of the certificate; conversion of the electronic fingerprint by means of the certification key and a set of equations; and comparison of the converted electronic fingerprint with a reference value which is transferred to the chipcard with the certificate. In this way, the encoding and decoding operations are eliminated since un-coded data is used in the equations.

According to the method of the invention, the cryptographic key is marked as a certified key when in the course of checking the digital signature, the digital signature is verified as the digital signature of the first part of the certificate. It can be made certain in this way that only those keys which have been correctly transferred to the chipcards and correctly stored in the chipcards can be used as certified keys. Because of the marking, when a cryptographic key is being used, the certified status of the cryptographic key can be determined with very little effort.

Using the method of the invention, a check can advantageously be made to establish whether or not the certification key for certifying the cryptographic key can be used. This ensures that to certify cryptographic keys, exclusively only those certification keys can be used, which themselves have been previously certified for this purpose by a "trustworthy authority".

An advantageous form of the invention provides that the certified key is used for the execution of security-sensitive instructions, whereby the security standard of a chipcard is improved.

The certified key can usefully be used as a further certification-key for the certification of a further cryptographic key. In this way, any kind of certification chain can be produced.

An advantageous extension of the invention provides that the cryptographic key can be used for the execution of non-security-sensitive instructions after the certificate has been transferred to the chipcard. This makes it possible to integrate the cryptographic key into feasible applications of the chipcard even before the conclusion of the certification.

A hash-value can advantageously be calculated by means of the hash-algorithm during the production of either the digital signature of the first part of the certificate or the electronic fingerprint of the first part of the certificate. This compresses the data to be processed during the certification activity and subsequently this data can be processed with less expenditure of time and effort in the course of further certification procedures.

By means of an advantageous form of the invention, it can be provided that the first and second parts of the certificate are transferred to the chipcard independently of one another, thus rendering illegal access to the certificate more difficult. Furthermore, with the aid of the separated transfer activities, the processing of the certificate on the chipcard can be given a more efficient form. In particular, one part of the certificate can be processed off-line while the other part is processed on-line.

A useful extension of the invention can be formed in such a way that the first part of the certificate includes administrative data. In particular, this makes it possible for the limiting conditions for the use and application of the cryptographic key to be determined.

In a useful form of the invention, the cryptographic key is assigned by the administrative data to one or more applications of the chipcard whereby those applications for which the key may be used can be ascertained in an unambiguous manner. Any misuse of the cryptographic key for other applications is thereby prevented.

An advantageous form of the invention provides that during personalization of the chipcard, the certification key is transferred to the chip card with the result that the certification key together with other security relevant data is loaded onto the chipcard.

The marking of the cryptographic key as a certificated key can advantageously be effected by the placement of a bit in a status-byte of the cryptographic key. This illustrates a possibility for marking the certified key which can easily be evaluated by the processor of the chipcard.

By means of an advantageous form of the invention, it can be provided that the marking of the cryptographic key as a certified key can be carried out by entering the cryptographic key in a table on the chipcard. In this way, all certified keys can be stored in the chipcard in a manner which can be inspected.

The marking of the cryptographic key as a certified key can be usefully carried out by storing the cryptographic key in a particular memory storage area of the chipcard. In order to use this cryptographic key at a later date, involves an exclusive reference to the particular memory storage area.

An advantageous extension of the invention provides that the administrative data includes an indication of a path of a memory storage area on the chipcard, whereby the cryptographic key is exclusively storable in this area of memory storage. In this way, a definite area of memory storage on the chipcard which adequately satisfies security standards can be assigned to the cryptographic key.

These and other advantages of the invention will be apparent from the specification of the preferred embodiment with reference to the drawing.

BRIEF DESCRIPTION OF THE DRAWING

FIG. 1 shows a sequence diagram of the method of the invention performing a certification procedure.

DESCRIPTION OF A PREFERRED EMBODIMENT OF THE INVENTION

Certificates, which are used on a chipcard in accordance with the invention to verify certified status of a cryptographic key have two parts: a first part which includes the actual data inclusive of the cryptographic key and a second part, the digital signature of the data from the first part.

As shown in FIG. 1, the first part of the certificate is produced at step 1 in the course of a certification procedure. The first part refers to components as shown in Table I.

TABLE I

| Components | Byte | Description |
|---|---|---|
| 1 | 0 | Bit 7: 0 = secret key |
|   |   | 1 = public key |
|   |   | Bit 6 – 0: key identification |
| 2 | 1 | Algorithm-identification |
| 3 | 2 | Hash-algorithm-identification |
| 4 | 3 | Padding-algorithm-identification |
| 5 | 4 | Use Byte 0 |
| 6 | 5 | Use Byte 1 |
| 7 | 7 | Nominal key length in bits |
| 8 | 9 | Length of a data block |
| 9 | 10 | Length of a signature |
| 10 | 11 | Length of the user information |
| 11 | 12 | Items of user information |
| 12 | 13 | Length of the key data |
| 13 | 15 | Key data |

Bit 7 in Component 1 of the certificate shows whether the certificating cryptographic key is a public or a secret key. Bits 6 through 0 in Component 1 of the first part of the certificate also displays a key identification. The key identification indicates permitted applications of the cryptographic key held in the certificate. If, following the completion of a successful certification, the cryptographic key is used in carrying out a specific application, this key identification is challenged and inspected to check that the certified key can be used for the specific application. Depending upon the outcome of this interrogation, either the cryptographic key can be used or an error announcement is given.

With the aid of the following Components 2, 3 and 4, algorithm identifications are given. Component 2 indicates the asymmetric cryptographic procedures for which the key to be certified is suitable. When the certified key is employed, for example, a hash algorithm and/or a padding algorithm can be used. This is determined with the aid of Components 3 and 4. The purpose of the hash algorithm is to compress the data. The compression is carried out before the actual encoding/decoding takes place. By using the padding algorithm, data can be extended to fill up any necessary block length.

With the aid of Components 5 and 6, application areas of the cryptographic key can be established. For example, with the aid of Component 5, it can be ascertained that the cryptographic key may only be used exclusively for the production of electronic signatures. Component 7 advises the length in bits of the cryptographic key, which is to be certified with the aid of the certificate. Components 8, 9 and 10 make it possible to transfer block-length data to a user of the cryptographic key.

Component 11 supplies text information about the cryptographic key. In particular, this can relate to application or security advice for the user. Component 12 indicates the actual length of the cryptographic key to be certified. Data relating to the key are to be found in Component 13.

After the first part of the certificate has been produced in accordance with Table I, the operation continues in accordance with FIG. 1 with the preparation at step 2 of the second part of the certificate. To do this, an electronic signature of the first part of the certificate is produced. An electronic signature serves, principally, to establish the authenticity of electronically-transferred information or of electronic documents. In the case of certification procedures in accordance with the invention, checking of the digital signature makes it possible to determine whether the certificate was transferred to the chipcard without being modified.

The sequence followed during the production of a digital signature may be illustrated as given below. A hash algorithm is used to develop a hash value from the first part of the certificate. The purpose of the hash algorithm is to compress the data forming the first part of the certificate. The hash value is also described as the finger print of the relevant data. After this, the hash value is decoded with a cryptographic algorithm, for example, the RSA. To decode this, one uses the secret key of a pair of keys which is entered as part of the appropriate certification procedure. The public key of this pair of keys, i.e. of the certification keys, is found on the chip card. The reason for a decoding operation during the preparation of a digital signature is based upon the convention that with the RSA algorithm, the secret key is always used for decoding and the public key is always used for encoding. The result of the decoding operation is the actual signature which is the content of the second part of the certificate.

The procedure followed in accordance with the invention can also be carried out in an advantageous manner with any other chosen procedure on the basis of a pair of keys including a secret and a public key. Pairs of keys can also be used, during an application in which no explicit decryption/encryption is carried out. In particular, procedures in which the resolving of a mathematical equation for the parameters hash value, secret key and public key is the prerequisite for carrying out the asymmetrical procedure can be used.

After the first and second parts of the certificate have been generated, both are transferred to the chipcard in steps 3 and 4. The two parts of the certificate can be transferred to the chipcard, either together or independently of one another. Separated transfer has the advantage that the amounts of data to be transferred to the relevant processes are smaller and, consequently, these quantities of data are easier to process.

After the first part of the certificate has been stored in the chipcard, the cryptographic key held there can first be used for the non-critical, non-security-sensitive operations on the chipcard. These non-critical operations include, in particular, the simple checking of a digital signature where in this case, the result of the checking activity will only be passed to an item of equipment which is in communication with the chipcard, but where, however, no change of status or any other changes take place in the card.

As shown in FIG. 1, during the next step 5, a search is made for a certification key in the card. This certification key is the public key of the stated pair of keys and must be authorized to release the certification and must, itself, already have been certificated. This means that it must be completely integrated in the chipcard. Preferably, the certification key should be installed and certified by the issuer of the card in the context of the personalization of the chipcard. However, certification keys can also be introduced into the chipcard at a later date after the personalization activity has been completed. The prerequisite is that the certification key is applied to the chipcard in circumstances which satisfy the appropriate security standards.

After the check has been made at step 6 to ensure that the certification-key may be used for the certification of the certificate transferred to the chipcard, the second part of the certificate which constitutes the digital signature is converted with the aid of the certification key. For this operation, the digital signature is encoded in accordance with the convention of the RSA algorithm. The result of the calculation is a hash value.

Furthermore, the fingerprint of the first part of the certificate, which is similarly a hash value, is calculated on the chipcard. The fingerprint is then compared with the result of the encoding operation described in the foregoing section. If both agree with one another the cryptographic key contained in the certificate is marked as a certified key.

Other cryptographic procedures may be used to test that the transfer of the certificate to the chipcard has been properly carried out and then to certify the transferred key. For example, the known DSA (digital signature algorithm) procedure can be named. In this case, a value r is calculated for the first part of the certificate by means of the secret key of the pair of keys and other mathematical parameters using generally known equations.

After the certificate has been transferred, the value r is used on the chipcard with the aid of further known equations in combination with the transferred certificate and the public key of the of the pair of keys to calculate a value v. If r and v agree with one another, the cryptographic key is marked at step 8 as a certified key. Use of the hash algorithm is also made when using the DSA procedure. Still other asymmetric procedures can be used for the certification activity if they guarantee the necessary standard of security.

The marking of a cryptographic key as "certified" is achieved, in the preferred embodiment, by placing a bit in a status-byte associated with the cryptographic key. However, other procedures for marking are possible without departing from the spirit and scope of the invention. These include storing the cryptographic key in a specific memory area of the chipcard or the establishment of a list containing all the cryptographic keys which have been marked as certified.

The decision as to which form of marking will be chosen depends, in particular, upon the architecture of the relevant chipcard and its applications.

After the marking activity for the cryptographic key has been completed, the certified key can be used at step 9 for the security sensitive operations. The marking is interrogated on every occasion that a cryptographic key is accessed. Once the certification has been concluded, the certified key is stored in the chipcard together with the accompanying data as shown in table I. The accompanying data can be interrogated each time the key is accessed but also interrogated to provide information about the key.

If a certified key is required in order to carry out a security-sensitive operation on the chipcard, the required cryptographic key is only used for that operation when its marking shows that a certified key is involved. If the testing of the marking produces a negative result, implying that it is not a certified key, an error announcement is given. In particular, external authorization forms part of the security-sensitive operations. This involves checking of the identity and authenticity of a communication partner of the chipcard.

The chipcard and its communication partner, for example a terminal, mutually establish whether or not the communication partner is a genuine terminal or a genuine chipcard.

An essential advantage of the certificate in accordance with Table I is that with the aid of informal data held in the certificate, the cryptographic key can be assigned to a specific application. This is of great importance, particularly in the area of the chipcard because here cryptographic keys must be assigned to individual applications rather than to individual persons. These applications can, for example, include a group of similar automatic cash point machines.

The digital determination of the application areas in the certificate, preferably by means of certificate components 1, 5 and 6 in the preferred embodiment, provides the opportunity to exclude misuse of the cryptographic key for other applications.

If a certified key is used in the context of carrying out a specific application, at the commencement of the access to this certified key there will be a challenge as to whether the certified key is authorized for the specific application. This can be done by means of the certified information in the first part of the certificate. This information was stored in the chipcard together with the certified cryptographic key after certification had been completed.

If data is included in the applications of the chipcard, this is present in the form of data files. These data files possess attributes which are determined, for example, by the party issuing the chipcard. Preferably, these attributes include a reference to the key identification of the certified key which must be used for a specific operation with the relevant data files. This key identification in the attribute must then agree with the key identification of the certified key such as component 2 of the certificate. If this is not the case, the operation is not carried out. In this way, any improper use of a certified key is prevented.

It will be recognized by those skilled in the art of cryptography and security system design that various changes, in addition to those already pointed out in the specification, can be made in an embodiment of the instant invention without departing from the spirit and scope of the invention which is measured by the following claims.

What is claimed is:

1. Method for certification of a cryptographic key for a chipcard comprising the steps of:
   a) generating at a trusted authority, an asymmetrical algorithm cryptography key pair;
   b) generating at the trusted authority, a hash of a public key of the key pair and administrative information related to the public key;
   c) generating at the trusted authority, a digital signature by decoding the hash using a certified secret key of a certified key pair of the asymmetrical algorithm, a certified public key of the certified key pair having been previously transferred to the chipcard from the trusted authority;
   d) transferring to the chipcard, a certificate having a first part including the administrative information and the public key and a second part including the digital signature of the first part of the certificate;
   e) encoding the digital signature of the second part of the certificate in the chipcard using the certified public key of the certified key pair previously transferred to the chipcard;
   f) generating in the chipcard, a hash of the first part of the certificate;
   g) comparing the encoded digital signature with the hash of the first part of the certificate;
   h) accepting the public key as a certified key for the chipcard when the hash of the first part of the certificate agrees with the encoded digital signature of the second part of the certificate.

2. Method of claim 1 wherein the step of accepting the public key as a certified key is carried out by storing the public key in a given memory area of the chipcard.

3. Method of claim 1 wherein the step of accepting the public key as a certified key is carried out by means of setting a bit in a status-byte of the public key.

4. Method of claim 1 wherein the step of generating a hash of the first part of the certificate further comprises:
   accessing the administrative information for hash algorithm information regarding the hash algorithm to be used.

5. Method of claim 1 wherein the step of encoding the digital signature further comprises the step of:
   allowing the public key to be used for carrying out non-security sensitive instructions before the public key has been certified.

6. Method of claim 1 further comprising the step of:
   i) using the certified key as a certified public key for the certification of a further public key.

7. Method of claim 1 wherein the certified key is assigned to one or several applications of the chipcard by means of the administrative data.

8. Method for certification of a cryptographic key for a chipcard comprising the steps of:
   a) generating at a trusted authority, an asymmetrical algorithm cryptography key pair;
   b) generating at the trusted authority, a hash of a public key of the key pair and administrative information related to the public key;
   c) generating at the trusted authority, a digital signature by encoding the hash using a certified secret key of a certified key pair of the asymmetrical algorithm, a certified public key of the certified key pair having been previously transferred to the chipcard from the trusted authority;
   d) transferring to the chipcard, a certificate having a first part including the administrative information and the public key and a second part including the digital signature of the first part of the certificate;
   e) decoding the digital signature of the second part of the certificate in the chipcard using the certified public key of the certified key pair previously transferred to the chipcard;
   f) generating in the chipcard, a hash of the first part of the certificate;
   g) comparing the encoded digital signature with the hash of the first part of the certificate;
   h) accepting the public key as a certified key for the chipcard when the hash of the first part of the certificate agrees with the encoded digital signature of the second part of the certificate.

9. Method of claim 8 wherein the step of accepting the public key as a certified key is carried out by storing the public key in a given memory area of the chipcard.

10. Method of claim 8 wherein the step of accepting the public key as a certified key is carried out by means of an entry of the public key in a table in the chipcard.

11. Method of claim 8 wherein the step of accepting the public key as a certified key is carried out by means of setting a bit in a status-byte of the public key.

12. Method of claim 8 wherein the step of encoding the digital signature further comprises the step of:
   allowing the public key to be used for carrying out non-security sensitive instructions before the public key has been accepted as a certified key.

13. Method of claim 8 further comprising the step of:
   i) using the certified key further comprises using the certified key as a certified public key for the certification of a further public key.

14. Method of claim 8 wherein the certified key is assigned to one or several applications of the chipcard by means of the administrative data.

15. A chipcard having a computer for certification of a cryptographic key to be used on the chipcard, the computer carrying out the steps of:
   a) receiving at the chipcard from a trusted source, a certificate having a first part including administrative information and a public key of an asymmetrical algorithm cryptography key pair, and a second part including a digital signature of a hash of the first part of the certificate;
   b) encoding the digital signature of the second part of the certificate in the chipcard using a certified public key of a certified key pair previously transferred to the chipcard from the trusted source;
   c) generating in the chipcard, a hash of the first part of the certificate;
   d) comparing the encoded digital signature with the hash of the first part of the certificate;
   e) accepting the public key as a certified key for the chipcard when the hash of the first part of the certificate agrees with the encoded digital signature of the second part of the certificate.

16. The chipcard of claim 15 wherein the computer step of generating in the chipcard, a hash of the first part of the certificate further comprises:
   accessing the administrative information for hash algorithm information regarding the hash algorithm to be used to hash the first part.

* * * * *